Figure 3:
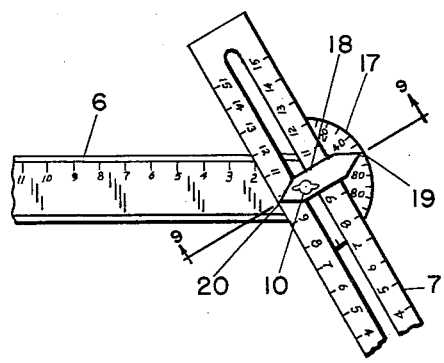

April 28, 1964 R. D. COPELAND 3,130,496
ANGLE MEASURING AND CUTTING DEVICE FOR TUBULAR CONDUITS
Filed Dec. 14, 1960 2 Sheets-Sheet 1
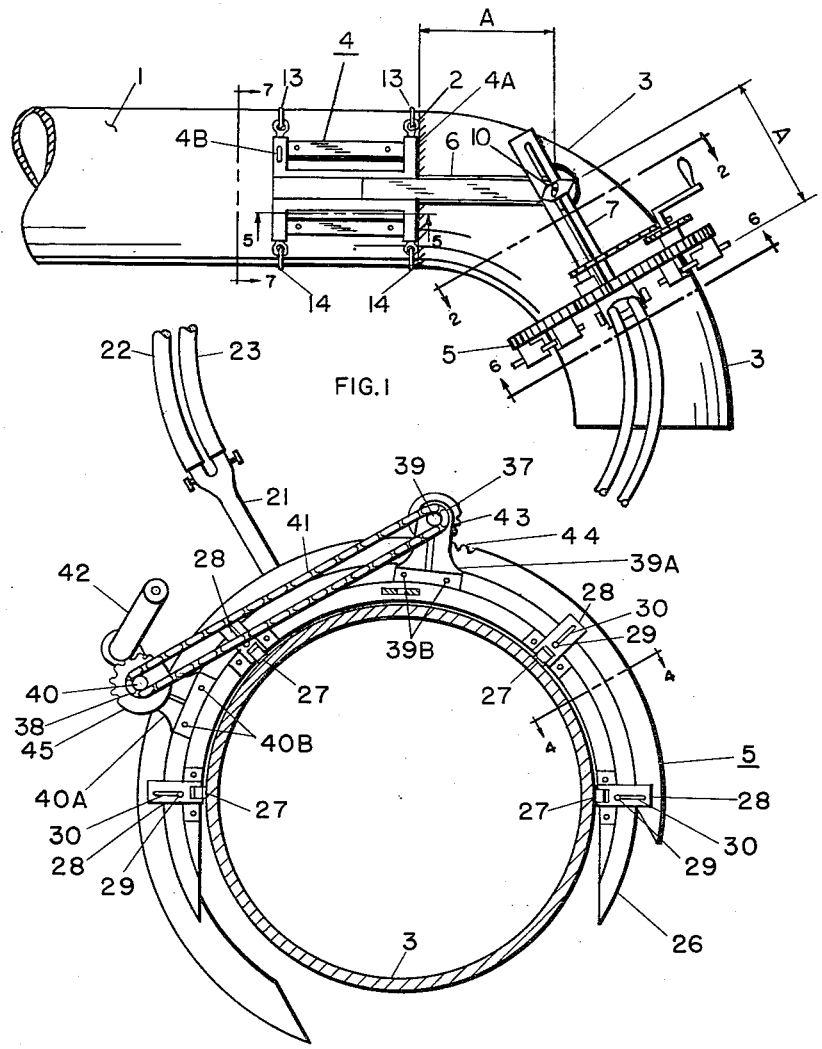
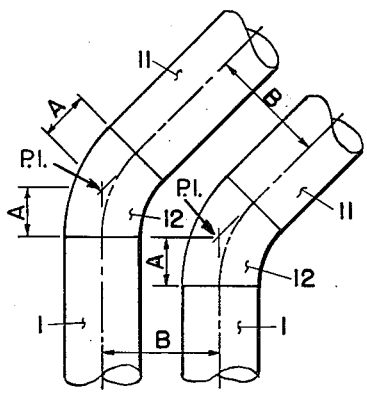
FIG. 8
*INVENTOR.*
ROY D. COPELAND
BY *Walter M. Rodgers*
ATTORNEY April 28, 1964 R. D. COPELAND 3,130,496
ANGLE MEASURING AND CUTTING DEVICE FOR TUBULAR CONDUITS
Filed Dec. 14, 1960 2 Sheets-Sheet 2

INVENTOR.
ROY D. COPELAND
BY *Walter M. Rodgers*
ATTORNEY

United States Patent Office 3,130,496
Patented Apr. 28, 1964

3,130,496
ANGLE MEASURING AND CUTTING DEVICE FOR TUBULAR CONDUITS
Roy Dee Copeland, 3356 Catalina Drive, Chamblee, Ga.
Filed Dec. 14, 1960, Ser. No. 75,804
7 Claims. (Cl. 33—21)

This invention relates to angle measuring and cutting devices and more particularly to a device for quickly and accurately measuring and cutting a pipe elbow or curved tubular fitting from a standard degree of angular bend to some desired degree of bend other than standard and without requiring the use of detailed and complicated calculations.

In constructing cross-country pipe lines such as gas mains, it has been the practice to change the course of such mains by means of rather complicated and empirical formulae. It is frequently necessary to position the pipe with care and precision irrespective of changes in direction and such a result is almost impossible of achievement except for highly trained specialists. Such computations also are time consuming and costly. Of course, if errors in computation are made, costly wastage of time and of material is likely to ensue.

A principal object of this invention is to expedite the installation of large pipes such as gas mains by simplifying the procedure and mechanics for changing the course of such pipes.

Another object of the invention is the provision of an improved combination calculator and cutting device which quickly and accurately enables unskilled operators to change the course of pipes.

Still another object of this invention is to provide a combination measuring and cutting device for use in connection with elbows or curved pipe fittings which in addition to determining a proper angular change of course also determines the actual face-to-center measurement of a particular angle of change of direction for the particular pipe size and thereby to provide for proper positioning of the pipe.

The invention in one form as applied to an angle cutter for pipe lines and conduits comprises a pair of pivotally connected angularly adjustable measuring elements on which linear indicating indicia are affixed, means for securing one of said measuring elements in slidable perpendicular relation to one face of a curved pipe fitting, a cutting device associated with the other measuring element and arranged to cut the tubular elbow at a desired predetermined angle, angle indicating means for depicting the angular relationship between the two measuring elements, the various elements being constructed and arranged so that the pivotal connection between the two measuring elements coincides with the "center" of the tube turn and the dimensional relationship between the one face of the pipe elbow and the pivotal connection corresponds to the face-to-center dimension of the elbow for a particular radius and diameter of pipe fitting and for a desired angle of turn.

Figure 4:
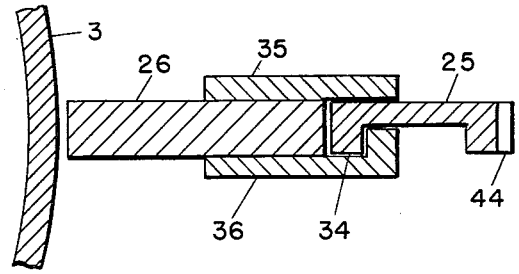
Figure 5:
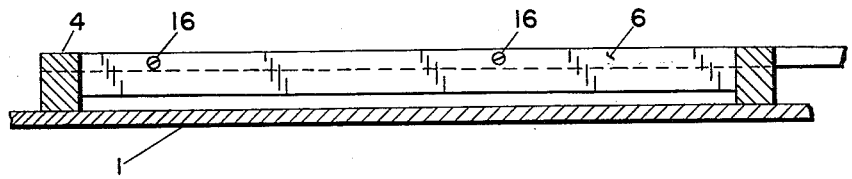
Figure 6:
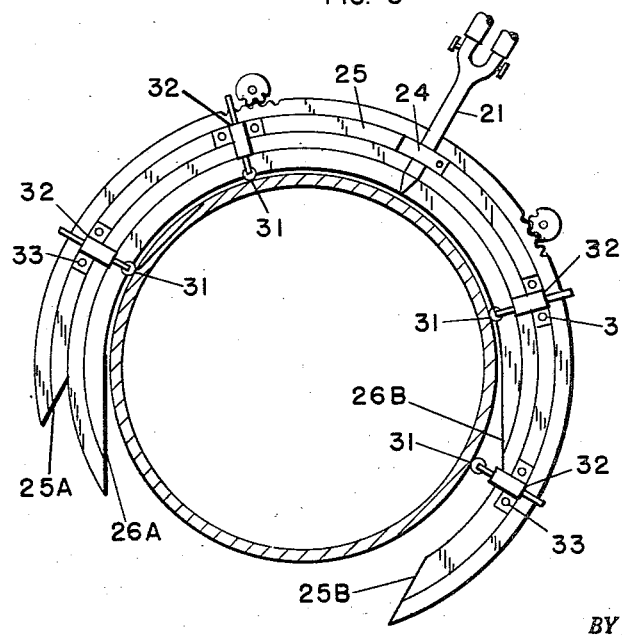
Figure 7:
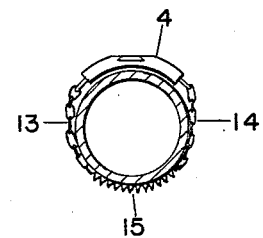
Figure 9:
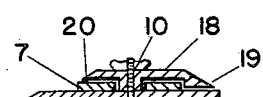

For a better understanding of the invention, reference may be had to the following detailed description taken in conjunction with the accompanying drawings in which FIGURE 1 is a plan view of a pipe and its associated curved fitting on which the measuring and cutting apparatus constructed according to this invention is mounted; FIGURE 2 is a cross-sectional view taken along the line designated 2—2 in FIGURE 1; FIGURE 3 is a plan view substantially enlarged of the measuring elements depicted in FIGURE 1; FIGURE 4 is an enlarged sectional view taken on the line designated 4—4 in FIGURE 2; FIGURE 5 is an enlarged sectional view taken along the line designated 5—5 in FIGURE 1; FIGURE 6 is a cross-sectional view taken along the line designated 6—6 in FIGURE 1; FIGURE 7 is a cross-sectional view taken along the line designated 7—7 in FIGURE 1; FIGURE 8 is a plan view of a pair of parallel pipes and illustrating an advantageous facet of the invention; and in which FIGURE 9 is a cross-sectional view taken along the line 9—9 as indicated in FIGURE 3.

With reference to FIGURE 1, the numeral 1 designates a straight section of a tubular pipe such as a gas main. This pipe 1 ordinarily is of a diameter between six and thirty-six inches. Secured as indicated by the welding junction 2 to the section of pipe 1 is an elbow or long radius pipe fitting 3 which as indicated in FIGURE 1 is of a standard 90 degree angular size. Of course, if it were desired to change the course of pipe 1 by 90 degrees, the standard size curved pipe section 3 as depicted in FIGURE 1 would accomplish the desired 90 degree change of direction. Under most conditions, however, some change of course other than a standard angular change is necessary due to topographical or other local conditions. Thus, the purpose of this invention is to provide suitable apparatus for quickly measuring and cutting the standard bent section 3 to some angle less than 90 degrees as indicated by a surveyor's data to effect a change of course of pipe 1.

The invention depicted in FIGURE 1 comprises a saddle structure generally designated by the numeral 4 which is secured to the straight section 1 of the main pipe, a cutting device generally designated by the numeral 5, a pair of measuring elements designated by the numerals 6 and 7 and angle measuring and indicating elements 17 and 19.

With saddle 4 securely affixed to straight section 1 of the pipe, measuring element 6 is slidably adjustable relative thereto and is maintained in parallel relation to the axis of straight section 1 of the pipe. Cutting element or head 5 thus can be moved about the elbow 3 due to the adjustable mounting of measuring element 6 in saddle 4 and to the slidable connection between measuring element 7 and measuring element 6 and the angular relation between elements 6 and 7 as indicated on protractor 17 by the pointer tip 19 of pointer 18. It will be understood that the measuring elements 6 and 7 and pointer 19 are interrelated by a pivotal connection designated by the numeral 10 and that the angle to which the parts are adjusted is the angle taken from a surveyor's data.

It will be understood that one face of the curved fitting 3 is defined by the weld 2 while the other face of the altered fitting section is defined by the cutting device 5. In FIGURE 1 it is apparent that the distance from face 2 to pivot 10 constitutes the face-to-center dimension "A" of the pipe elbow as commonly used in the trade and that the distance between the cut made by cutting device 5 and pivot 10 also constitutes the face-to-center dimension "A" of the pipe elbow and that these dimensions along measuring elements 6 and 7 are equal when adjustment is proper. By the invention the face-to-center actual measurement is readily read from suitable graduations on measuring elements 6 and 7. This information is of particular advantage as will be understood from FIGURE 8.

In FIGURE 8 a pair of straight pipes 1 are arranged in parallel relation and are spaced apart by a distance "B." In FIGURE 8 the face-to-center dimension of the elbow section 12 is indicated by the letter "A." The P.I. from the surveyor's data and as designated by a surveyor's ground marker will coincide with the "center" of the pipe fitting after it is installed. Thus in practice each pipe 1 is laid beyond its P.I. and must be cut off by the distance "A." Thus from FIGURE 8 it is apparent that it is desirable for an operator to be able to measure in actual dimensional terms the face-to-center dimensions of a particular angle of turn for a particular size of pipe. By the invention this information is obtained automatically and is read directly from the measuring elements as designated by the numerals 6 and 7, such indicia being indicated in FIGURE 3. In practice it may be desirable to make this measurement by simulated procedures rather than on the actual conduit 1. For example, the curved fitting to be cut may be mounted temporarily on a separate pipe and the derived measurement made and this curved section cut. Thereafter, the pipe 1 is cut and the already cut elbow may be welded to pipe 1.

For the purpose of mounting the measuring element 6 in slidable relation to the pipe section 1 and in perpendicular relation to the face 2 of the pipe elbow 3, the saddle 4 is securely affixed to pipe section 1 by means depicted in FIGURE 7. As shown in FIGURE 7, the saddle 4 is provided with chain elements 13 and 14 which are interconnected by spring 15. Elements 13 and 14 are secured by any known type of construction such as a boomer type latch buckle or other known device. As is shown in FIGURE 1, the saddle 4 is provided with chains 13 and 14 at each end thereof. As is best shown in FIGURE 5, the slidable relation between measuring element 6 and saddle 4 may be utilized to vary the effective face-to-center dimension of the pipe elbow 3 and when a desired dimension is obtained, measuring element 6 may be locked with respect to saddle 4 by means of set screws 16 which are simply tightened for this purpose.

For the purpose of determining the angular relationship between the measuring elements 6 and 7, a protractor 17, which is suitably graduated in degrees as shown in the drawing, is securely affixed and forms an integral part of the right-hand end of measuring element 6. The angular relationship between elements 6 and 7 is indicated by pointer 18 which is provided with an aperture through which the pivot 10 extends. As is best shown in FIGURE 9, pointer 18 is slidably related with respect to the measuring element 7 but cannot rotate with respect to measuring element 7. Furthermore, as is apparent from both FIGURES 3 and 9, the pointer 18 is rotatable about pivot 10 in response to a change in the angular relationship between measuring elements 6 and 7. As is apparent from FIGURE 3 the angular relation between measuring elements 6 and 7 is designated on protractor 17 by the pointer tip 19 while the dimensional relationship between the pivot 10 and the cutting element 5 along measuring element 7 is designated by the measuring tip 20 in terms of the graduations which are affixed along the upper surface of the measuring element 7.

From the discussion thus far it will be understood that with the cradle 4 secured in level position as indicated by bubble 4B and arranged so that its right-hand face 4A coincides with the weld 2, the center-to-face measurement is established along measuring element 6 by simply setting the proper desired angle between measuring elements 6 and 7. It will be understood that this dimension is a result of a proper angular setting as read on the protractor indicia 17 by the angular indicating pointer 19 and that once the angle is correctly determined the face-to-center measurement may be read directly from the measuring element 6 at the point thereon which is adjacent the face 4A of the saddle 4. In like fashion, pointer 20 should then read an equal dimension along the graduated scale on the upper surface of measuring element 7. As already explained, the dimension "A" may be used as is indicated in FIGURE 8 to cut off the straight sections of pipe 1 by an amount sufficient to position the pipes 1 and 11 and curved fitting 12 correctly.

For the purpose of cutting the other face of the pipe, the cutting device generally designated by the numeral 5 is used. The cutting device comprises a conventional cutting torch 21 which is supplied with a combustible mixture through the flexible conduits 22 and 23 in known manner.

As is best shown in FIGURE 6, cutting torch 21 is mounted by means of bracket 24 to ring gear 25. As will be best understood from FIGURES 2 and 4, ring gear 25 is rotatably supported by an arcuate frame 26 on which a plurality of rollers 27 are adjustably secured by mounting brackets 28, adjustment being achieved by set screws 29 in cooperation with slots 30. As will be apparent from FIGURE 2, the rollers 27 are mounted on fixed axes and hence are arranged merely to accommodate movement of the structure depicted in FIGURE 2, comprising the cutting head or element 5, only in a direction parallel to the axis of curved fitting 3. Thus the rollers 27 prevent relative rotation between the supporting frame 26 and the fitting 3.

Relative rotation of torch 21 about the periphery of elbow 3 is accommodated by the rollers 31 as best shown in FIGURE 6. Rollers 31 are mounted on brackets 32 which in turn are secured to ring gear 25 by bolts 33. As can best be seen in FIGURE 4, the ring gear 25 is provided with a depending part 34 which is captured between plates 35 and 36 secured to frame 26 so as to preserve a precise spacing for the torch 21 relative to the elbow 3. Thus with the frame 26 secured against rotation about the axis of the curved fitting by means of rollers 27, the torch supporting ring gear 25 may be rotated about the elbow as will be explained.

For the purpose of enabling the frame 26 and the ring gear 25 to be readily mounted about the elbow 3, the periphery of these elements is broken as defined by the gap designated at 26A and 26B in the frame 26 and as designated by the gap 25A and 25B in the ring gear 25.

For the purpose of imparting rotary motion to the ring gear 25 and its associated torch 21 any suitable mechanism may be used such as is depicted in FIGURES 2 and 6. Such mechanism may constitute a pair of sprockets 37 and 38 which are respectively mounted on stub shafts 39 and 40 and which are interconnected by a chain drive 41. Shafts 39 and 40 are supported by brackets 39A and 40A secured by bolts 39B and 40B to frame 26. Rotary motion is imparted to both sprockets 37 and 38 by the hand crank designated by the numeral 42. Secured to and rotatable with the stub shaft 39 is a driving pinion 43 whose teeth engage the teeth 44 formed about the entire periphery of the ring gear 25. In like fashion, a driving pinion 45 is mounted on and rotatable with the stub shaft 40 and its teeth cooperate with the teeth 44 on the ring gear 25. As is well known in the art, the purpose of the two sprockets and their associated pinions is to accommodate the gap between surfaces 25A and 25B, it being understood that the arcuate spacing between pinions 43 and 45 is greater than the arcuate gap between surfaces 25A and 25B. In view of this, one of the pinions, either 43 or 45, is always in contact with the teeth 44. In this way, positive and certain rotation of the ring gear 25 via its rollers 31 about the entire periphery of the curved fitting 3 is insured.

It will be appreciated that the graduations along the upper surface of measuring element 7 are arranged thereon in such a way that an arcuate reading is obtainable for the distance between the face of the tube turn 3 after the cut is made by torch 21 and the "center" as represented by pivot 10.

In view of the discussion above, it will be obvious that by the invention means are provided not only to quickly and easily measure the desired angle of turn and to readily make an appropriate and accurate cut of the pipe elbow to effect the desired change in course of the pipes without error but also that means are inherent whereby the dimension "A" from face-to-center of the pipe elbow after the cut is made for a particular size pipe is readily determinable from the measuring elements 6 and 7.

While I have shown and described a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. A measuring device comprising a first linear measuring element, a second linear measuring element slidably connected with and angularly adjustable relative to said first linear measuring element, angle measuring means mounted on and affixed in position relative to said first linear measuring element, and indicating means pivotally connected with said first linear measuring element, said second linear measuring device being interposed between said indicating means and said angle measuring means and having indicia thereon disposed to register with a first part of said indicating means and said indicating means being movable linearly but not angularly relative to said second linear measuring element and indicating particular linear relationship therebetween and said indicating means being angularly but not linearly movable relative to said angle measuring means and to said first linear measuring element and having a second part for indicating particular angular relationships therebetween.

2. A measuring device for indicating a predetermined angle between one face and another face of a curved tubular section of pipe whose one face is secured to a straight section of pipe, said measuring device comprising a saddle affixed to said straight section of pipe, a first linearly graduated measuring element adjustably related linearly to said saddle and disposed in parallel relation to said straight section of pipe, a second linearly graduated measuring element pivotally connected with said first measuring element, said measuring elements being angularly and linearly adjustable relative to each other, indicating means having a pair of pointers and mounted at the pivotal connection between said linearly graduated measuring elements, and measuring means mounted on said first measuring element and angularly adjustable relative to said second measuring element for indicating in cooperation with one of said pointers the angular relationship therebetween, the other of said pointers being disposed to indicate a particular point on the graduations on said second measuring element, the pivotal connection between said measuring elements coinciding with the center of the curved section of pipe when the measurements indicated on said measuring elements are equal to the center-to-face dimensions of the curved section for the predetermined angle.

3. A measuring and cutting device for use with a curved tubular section of pipe affixed at one face to a straight section of pipe, said device comprising a saddle affixed to said straight section of pipe, a first graduated measuring element slidably related with said saddle and disposed in parallel relation to the axis of said straight section of pipe, a second graduated measuring element pivotally and slidably connected with said first graduated measuring element so that the graduations on said first measuring element are indicative of the distance between the face of the curved section of pipe adjacent said saddle and the pivotal connection between said measuring elements, cutting means secured to said second measuring element, the graduations on said second measuring element being indicative of the distance between the pivotal connection between said elements and said cutting means, and means including a protractor affixed to said first measuring element and an indicator mounted at the pivotal connection between said measuring elements and having a pair of pointers one of which registers with said protractor for indicating the angular relationship between said measuring elements and the other of which registers with the graduations on said first measuring element.

4. A measuring and cutting device for use with a curved section of pipe affixed at one face to a straight section of pipe, said device comprising a saddle affixed to said straight section of pipe, a first graduated measuring element slidably related with said saddle and disposed in parallel relation to the axis of said straight section of pipe, a second graduated measuring element pivotally and slidably connected with said first graduated measuring element so that the graduations on said first measuring element are indicative of the distance between the face of the curved section of pipe adjacent said saddle and the pivotal connection between said measuring elements, cutting means secured to said second measuring element, the graduations on said second measuring element being indicative of the distance between the pivotal connection between said elements and said cutting means, low friction means interposed between said cutting means and the outer surface of the curved section, said low friction means being arranged to facilitate relative movement therebetween in a direction parallel to the axis of the curved section and to impede relative movement therebetween in a circumferential direction, and means including a protractor affixed to said first measuring element and an indicator mounted at the pivotal connection between said measuring elements and having a pair of pointers one of which registers with said protractor for indicating the angular relationship between said measuring elements and the other of which registers with the graduations on said first measuring element.

5. In combination, a pair of measuring elements pivotally connected together in angularly adjustable relation, means for securing one of said measuring elements in substantially perpendicular relation to one face of a pipe elbow, said one measuring element being adjustable to vary the distance between said one face of the pipe elbow and the pivotal connection between said measuring elements, a cutting element rotatably mounted on the other of said measuring elements, said other measuring element being adjustable to vary the distance between said cutting element and the pivotal connection between said measuring elements, and means including a protractor affixed to said first measuring element and an indicator mounted at the pivotal connection between said measuring elements and having a pair of pointers one of which registers with said protractor for indicating the angular relationship between said measuring elements and the other of which registers with the graduations on said first measuring element.

6. In combination, a pair of measuring elements pivotally connected together in angularly adjustable relation, means for securing one of said measuring elements in substantially perpendicular relation to one face of a pipe elbow, said one measuring element being adjustable to vary the distance between said one face of the pipe elbow and the pivotal connection between said measuring elements, a cutting element rotatably mounted on the other of said measuring elements, said other measuring element being adjustable to vary the distance between said cutting element and the pivotal connection between said measuring elements, and means including a protractor on one of said measuring elements and indicating means mounted at the pivotal connection between said measuring elements and having a pair of pointers one cooperating with said protractor for indicating the angular relationship between said measuring elements, said measuring elements being graduated to indicate the distance between the pivotal connection therebetween and said cutting element and said one face of the pipe elbow respectively, the other pointer being disposed to cooperate with the graduations on said other measuring element whereby the distance between said cutting element and the pivotal connection between said measuring elements may be read directly.

7. A measuring device comprising a first linear measuring element, a second linear measuring element slidably connected with and angularly adjustable relative to said first measuring element, and indicating means pivotally connected with said first measuring element, said first measuring element having thereon both linear and angle measuring indicia, and said indicating means having two diametrically opposed measuring tips, one positioned to indicate a linear relationship on said second measuring element and the other cooperating in an angular relationship with the angle measuring means of said first measuring element to indicate a particular angular relationship between said measuring elements.

References Cited in the file of this patent

UNITED STATES PATENTS

| | | |
|---|---|---|
| 781,971 | Thomas | Feb. 7, 1905 |
| 1,346,409 | Lucas | July 13, 1920 |
| 1,692,925 | Brown | Nov. 27, 1928 |
| 1,991,117 | Porteous et al. | Feb. 12, 1935 |
| 1,998,729 | Mathey et al. | Apr. 23, 1935 |
| 2,382,618 | Douglass | Aug. 14, 1945 |
| 2,636,273 | Morris | Apr. 28, 1953 |
| 2,848,215 | Pendergrass | Aug. 19, 1958 |
| 3,000,098 | Holder | Sept. 19, 1961 |

FOREIGN PATENTS

| | | |
|---|---|---|
| 111,949 | Sweden | Sept. 26, 1944 |